E. C. COOPER.
TRANSMISSION SHAFT.
APPLICATION FILED JUNE 10, 1912.

1,186,751. Patented June 13, 1916.

WITNESSES
Chas. J. Fitzsimons
LeRoi J. Williams

INVENTOR
Erwin C. Cooper
By Walton Tibbetts
Attorney

UNITED STATES PATENT OFFICE.

ERWIN C. COOPER, OF DETROIT, MICHIGAN, ASSIGNOR TO PACKARD MOTOR CAR COMPANY, OF DETROIT, MICHIGAN, A CORPORATION OF MICHIGAN.

TRANSMISSION-SHAFT.

1,186,751.     Specification of Letters Patent.     Patented June 13, 1916.

Application filed June 10, 1912. Serial No. 702,773. REISSUED

*To all whom it may concern:*

Be it known that I, ERWIN C. COOPER, a citizen of the United States, and resident of Detroit, Wayne county, State of Michigan, have invented certain new and useful Improvements in Transmission-Shafts, of which the following is a specification.

This invention relates to transmission shafts and particularly to improvements in universal joints for such shafts, to the bearings therefor, and to casings for such joints.

The invention will be described in connection with the accompanying drawing in which—

Figure 1:
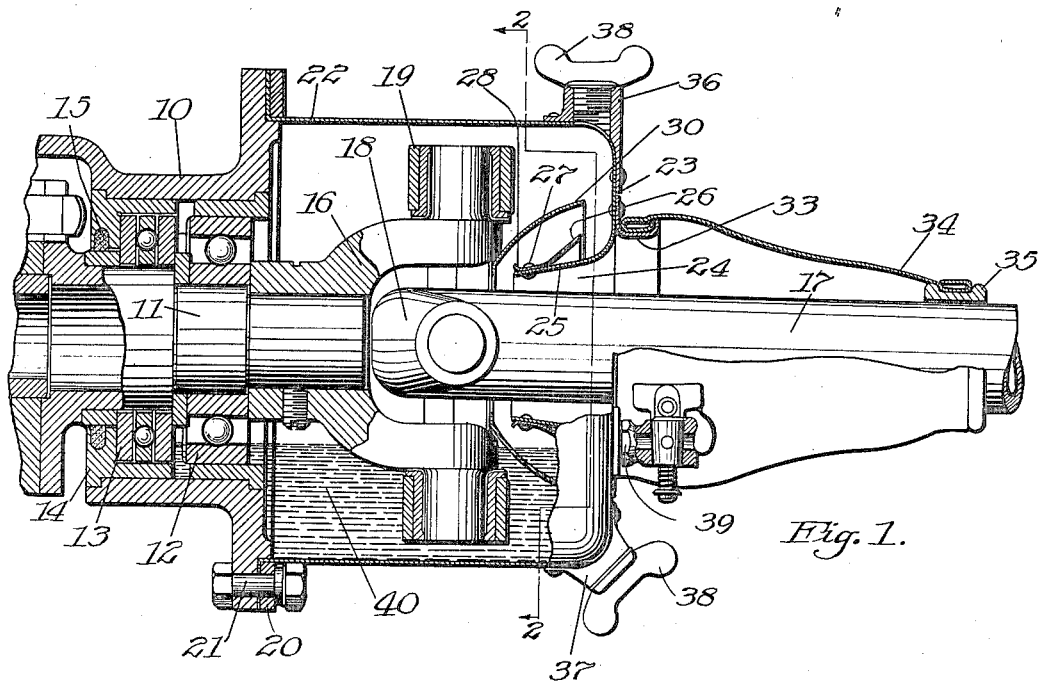
Figures 2, 3:
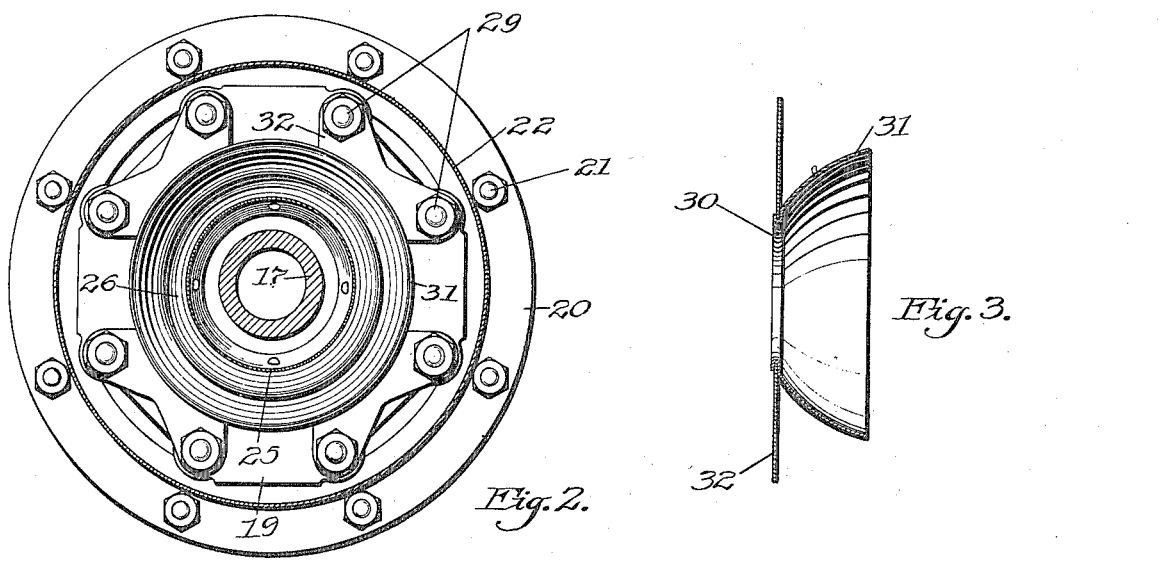

Figure 1 is a sectional view of a two-part shaft, a universal joint, and a casing therefor; Fig. 2 is a section on the line 2—2 of Fig. 1; and Fig. 3 is a detail view.

Referring to the drawing, 10 indicates a supporting member in which the shaft section 11 is mounted on annular and thrust bearings 12 and 13 respectively. A collar 14 and packing 15 surround the shaft 11 as shown, to retain the bearings in place and for the purpose of preventing leakage of lubricant around the shaft.

Upon the end of the shaft 11 is mounted one member 16 of a universal joint, and a second shaft 17 has the other member 18 of the universal joint thereon. The members 16 and 18 are connected by a ring 19 in which they are both trunnioned.

Secured to the support 10, as by ring 20 and bolts 21, is a cylindrical casing 22 which surrounds the universal joint and has an end portion 23 in which there is an opening 24 through which the shaft 17 extends. This end 23 has an inwardly extending annular flange 25 which is tapered as shown and its inner end is just far enough from the shaft to permit the desired movement thereof.

To prevent lubricant escaping from the casing by falling on the upper side of the flange 25 and from there dripping to the shaft 17, the flange is provided with a skirt 26 riveted to it as at 27. This skirt 26 is also provided with a lip 28 to further prevent lubricant dripping onto the shaft 17 and causing it to flow back into the casing. As a still further means of preventing the escape of lubricant, the ring 19 has secured to it by the bolts 29, which also secure the two parts of the ring together, a throw-off ring 30 which is in the form shown in the drawing and consists of a bell-shaped portion 31 secured to a plate portion 32 by which it is attached to the ring 19. The bell-shaped portion 31 of this throw-off ring surrounds the flange 25 and as it rotates with the universal joint and the shafts, the centrifugal force causes the oil picked up by the universal joint to be thrown radially outward against the sides of the casing where it flows back into the bottom of the casing. The end 23 of the casing is also provided with an outwardly extending flange 33 to which is secured a flexible dust protector 34 the other end of which is secured to a ring 35 which has a fairly close bearing on the shaft 17 as shown in the drawing.

The casing is further provided with a filler opening 36 and a drain opening 37 which are closed by caps 38. There is also a pet cock 39 mounted in the end of the casing at the desired oil level, which pet cock may be opened when the casing is being filled to determine when the casing has received the correct amount of lubricant.

It will be observed that the bearings 12 and 13 are open to the interior of the casing so that the lubricant 40 therein may flow directly to these bearings and keep them running in oil. It is only necessary to keep the oil up to the level and the joint and the bearings are assured of proper lubrication, and the oil is prevented from escaping by means of the packing 15 surrounding the shaft 11 and the throw-off ring and the flange on the universal joint and casing respectively. Of course the dust cover 34 also takes care of any small amount of lubricant that might possibly escape from the casing.

Having thus described my invention what I claim and desire to secure by Letters Patent is,—

1. The combination with two shaft members and a universal joint connecting them, of a casing surrounding said joint and having an open end through which one of said shaft members extends, said casing having an annular flange projecting inwardly from said end toward the central portion of said joint, and means mounted on the joint and having a flange rotating therewith and overhanging the casing flange and adapted to throw the lubricant away from said flange.

2. The combination with two shaft members and a universal joint connecting them, of a casing surrounding said joint and having an open end through which one of said shaft members extends, said casing having a conical flange projecting inwardly from said end toward the central portion of said joint, and a bell-shaped device on said joint extending outwardly from the center thereof and surrounding said casing flange.

3. The combination with two shaft members and a universal joint connecting them, of a casing surrounding said joint and having an open end through which one of said shaft members extends, said casing having a conical flange projecting inwardly from said end toward the central portion of said joint, and said flange having a skirt at its inner end, for the purposes described.

4. The combination with a support, a shaft mounted in bearings therein, a second shaft, a universal joint connecting said shafts, a stationary casing surrounding said joint and having an open end through which said second shaft extends, and a throw-off ring mounted on said joint and adapted to rotate therewith, for the purposes described.

5. The combination with a rotary shaft, of a casing through an opening in which one end of the shaft extends, said casing having an annular flange projecting inwardly from said opening toward said shaft, and means mounted on the shaft and having a flange rotating therewith and overhanging the casing flange.

6. The combination with a rotating member, of a casing partly surrounding said member and provided with an opening through which one end of said member extends, said casing having an annular flange projecting inwardly from said opening toward said member, and a bell shaped device on said member extending outwardly from the center thereof toward said flange.

In testimony whereof I affix my signature in the presence of two witnesses.

ERWIN C. COOPER.

Witnesses:
P. P. VERNER,
F. O. DYE.